(12) United States Patent
Chiang et al.

(10) Patent No.: US 8,498,101 B2
(45) Date of Patent: Jul. 30, 2013

(54) SUPPORT FRAME AND ELECTRONIC APPARATUS

(75) Inventors: I-Ting Chiang, Taipei (TW); Sung-Yu Hsieh, Taipei (TW); Kuo-Hsing Wang, Taipei (TW); Chun-Chieh Chen, Taipei (TW); An-Ting Wang, Taipei (TW); Hsiu-Wei Yeh, Taipei (TW); Wei-Fan Tsai, Taipei (TW)

(73) Assignee: Wistron Corporation, Taipei Hsien (TW)

( * ) Notice: Subject to any disclaimer, the term of this patent is extended or adjusted under 35 U.S.C. 154(b) by 273 days.

(21) Appl. No.: 12/860,082

(22) Filed: Aug. 20, 2010

(65) Prior Publication Data

US 2011/0279962 A1 Nov. 17, 2011

(30) Foreign Application Priority Data

May 13, 2010 (TW) ................................ 99115287 A

(51) Int. Cl.
*H05K 7/16* (2006.01)
(52) U.S. Cl.
USPC .................. 361/679.22; 361/679.27; 248/121; 248/127
(58) Field of Classification Search
USPC ............. 361/679.01, 679.02, 679.21, 679.22, 361/679.26, 679.27; 248/917–924, 121, 137, 248/455, 441.1
See application file for complete search history.

(56) References Cited

U.S. PATENT DOCUMENTS

| | | | |
|---|---|---|---|
| 5,720,465 A | 2/1998 | Peltzer et al. | |
| 6,917,301 B2 * | 7/2005 | Blum et al. | 340/815.4 |
| 7,236,354 B2 * | 6/2007 | Hsu et al. | 361/679.07 |
| 2005/0134474 A1 * | 6/2005 | Kokonaski et al. | 340/815.4 |
| 2009/0020660 A1 | 1/2009 | Yang | |
| 2012/0085713 A1 * | 4/2012 | Bowser et al. | 211/26 |

FOREIGN PATENT DOCUMENTS

| | | |
|---|---|---|
| TW | I224467 | 11/2004 |
| TW | M362590 | 1/2006 |
| TW | M357166 | 5/2009 |

OTHER PUBLICATIONS

Chinese Office Action issued for CN Application No. 201010176476.2 mailed Jul. 2, 2012.
Taiwanese Office Action issued for TW Application No. 099115287 issued Sep. 26, 2012.

* cited by examiner

*Primary Examiner* — Jinhee Lee
*Assistant Examiner* — Ingrid Wright
(74) *Attorney, Agent, or Firm* — Steptoe & Johnson LLP

(57) ABSTRACT

A support frame is adapted to provide support to a display device, and includes a pivot seat module, a first support module and a second support module. The pivot seat module is adapted to be mounted to the display device for rotation relative to the display device about a first axis passing through the display device. The first support module is coupled to the pivot seat module, and is disposed to form an angle with a backside of the display device for supporting the display device at a substantially upright position. The second support module is coupled to the pivot seat module, is pivotable relative to the pivot seat module about a second axis that is orthogonal to the first axis, and cooperates with the first support module to support the display device at a lying position.

22 Claims, 11 Drawing Sheets

SUPPORT FRAME AND ELECTRONIC APPARATUS

CROSS-REFERENCE TO RELATED APPLICATION

This application claims priority of Taiwanese Application No. 99115287, filed on May 13, 2010.

BACKGROUND OF THE INVENTION

1. Field of the Invention

The invention relates to a support frame and an electronic apparatus incorporating the same.

2. Description of the Related Art

A conventional support frame for a display device is generally mounted on the backside of the display device, such that the display device can be positioned in an upright or slightly tilted manner so as to facilitate viewing by a user at eye level.

As display technology advances, various display devices with touch control, projection or 3D imaging functionalities have emerged. The conventional support frame that could only facilitate upright or slightly tilted positioning of the display device is no longer suitable as users now need more flexible operating angles.

SUMMARY OF THE INVENTION

Therefore, the object of the present invention is to provide a support frame for a display device that can provide various operating angles of the display device to a user so as to enhance flexibility, convenience and comfort in using the display device supported by the support frame.

Another object of the present invention is to provide an electronic apparatus that incorporates such support frame.

According to one aspect of the present invention, there is provided a support frame that is adapted to be disposed on a backside of a display device to provide support to the display device. The support frame includes a pivot seat module, a first support module and a second support module. The pivot seat module is adapted to be mounted on the backside of the display device for rotation relative to the display device about a first axis passing through the display device. The first support module is coupled to the pivot seat module, and is disposed to form an angle with the backside of the display device for supporting the display device at a substantially upright position. The second support module is coupled to the pivot seat module, is pivotable relative to the pivot seat module about a second axis that is orthogonal to the first axis, and cooperates with the first support module to support the display device at a lying position.

According to another aspect of the present invention, there is provided an electronic apparatus that includes a display device and a support frame disposed on a backside of the display device. The support frame includes a pivot seat module, a first support module and a second support module. The pivot seat module is mounted to the backside of the display device for rotation relative to the display device about a first axis passing through the display device. The first support module is coupled to the pivot seat module, and is disposed to form an angle with the backside of the display device for supporting the display device at a substantially upright position. The second support module is coupled to the pivot seat module, is pivotable relative to the pivot seat module about a second axis that is orthogonal to the first axis, and cooperates with the first support module to support the display device at a lying position.

According to yet another aspect of the present invention, there is provided an electronic apparatus that includes a display device and a support frame. The support frame is disposed on a backside of the display device, and includes a pivot seat module, a first support module and a second support module. The first support module is coupled to the pivot seat module. The second support module is coupled to the pivot seat module. The first and second support modules are operable to abut against each other and support the display device at a substantially upright position. The first and second support modules are operable to pivot relative to the pivot seat module away from each other and support the display device at a lying position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
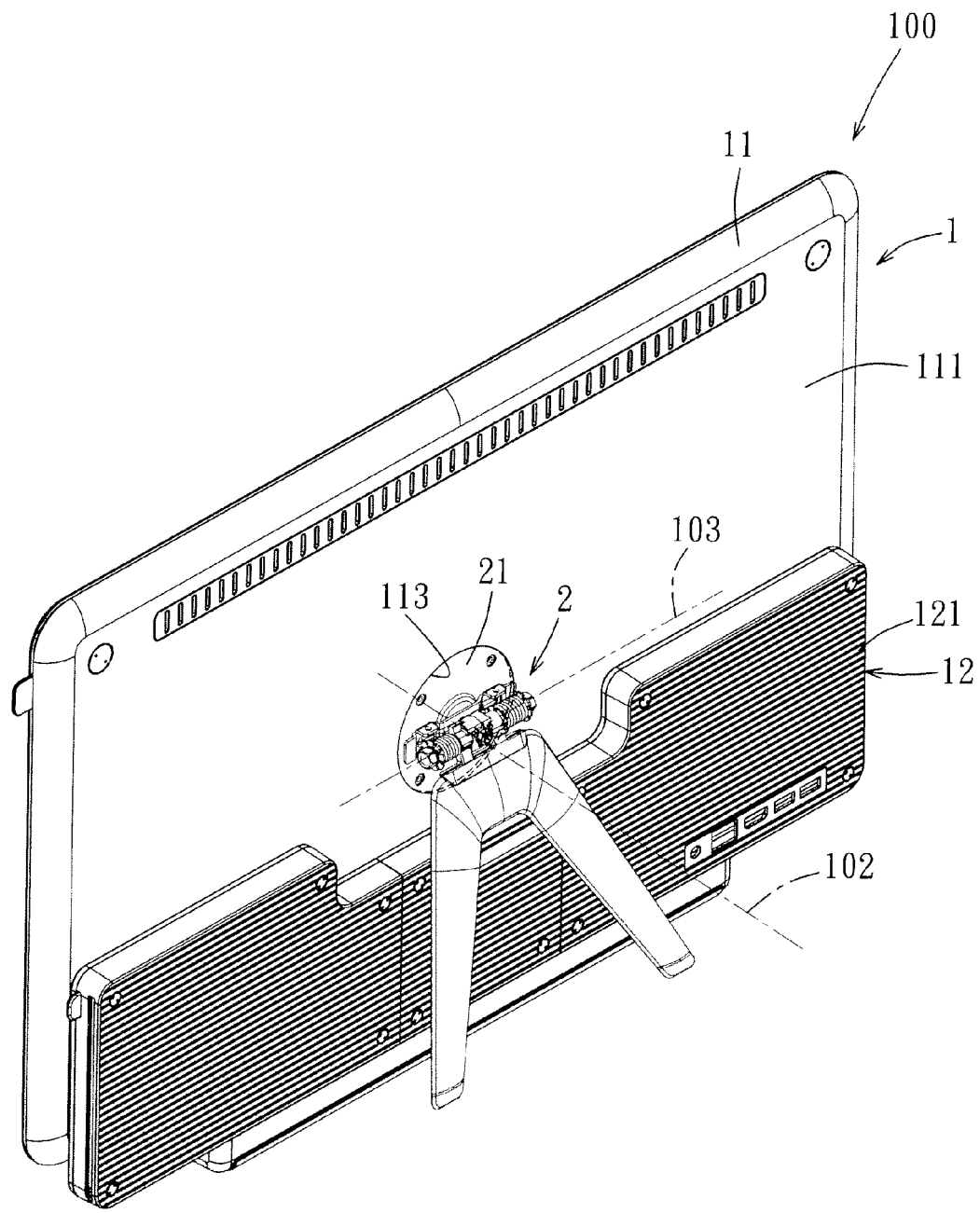
FIG. 1 is a rear perspective view of the preferred embodiment of an electronic apparatus including a display device and a support frame according to the present invention.
Figure 2:
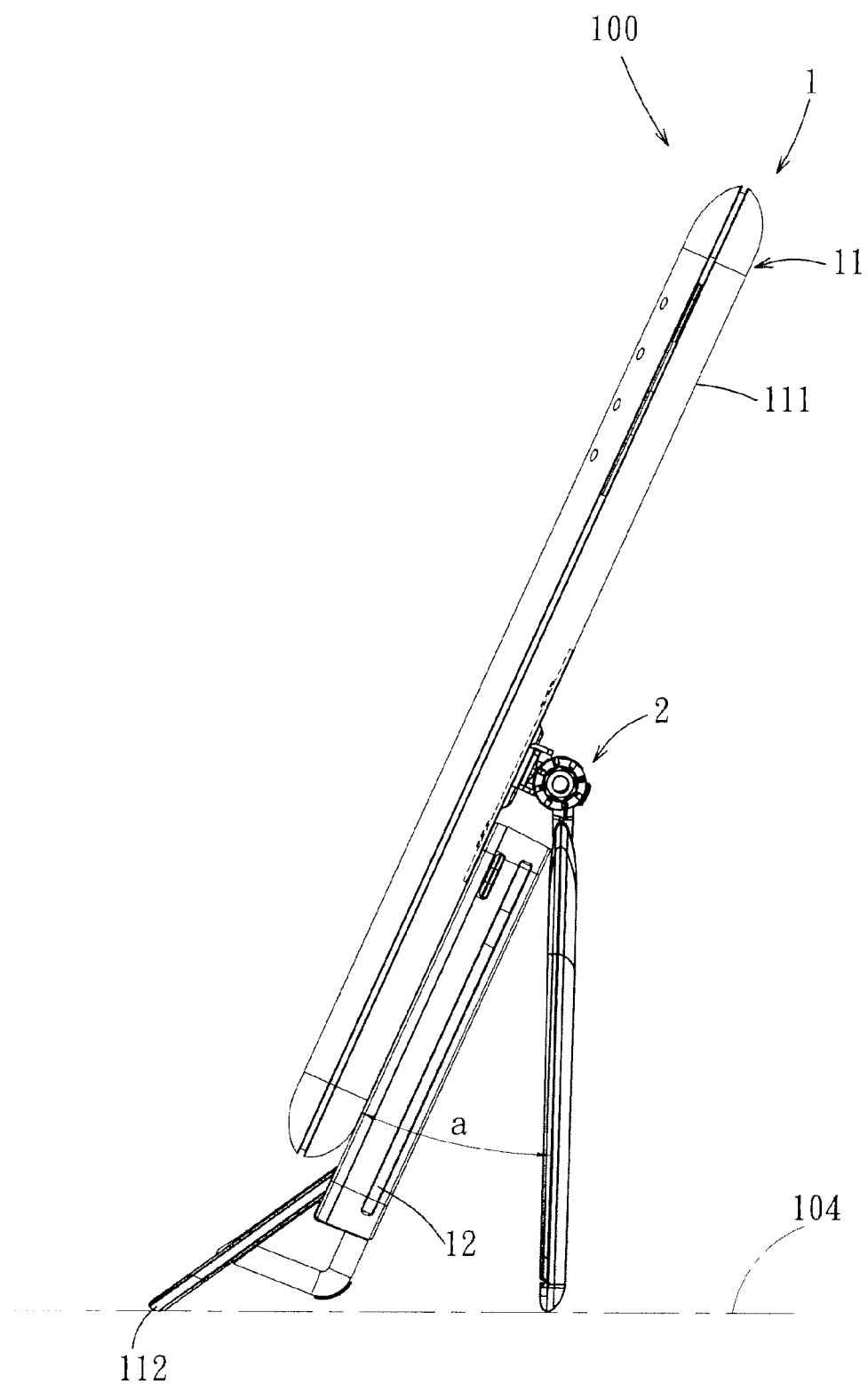
FIG. 2 is a side view of the preferred embodiment when the display device is supported by the support frame at a substantially upright or back-tilting position.
Figure 3:
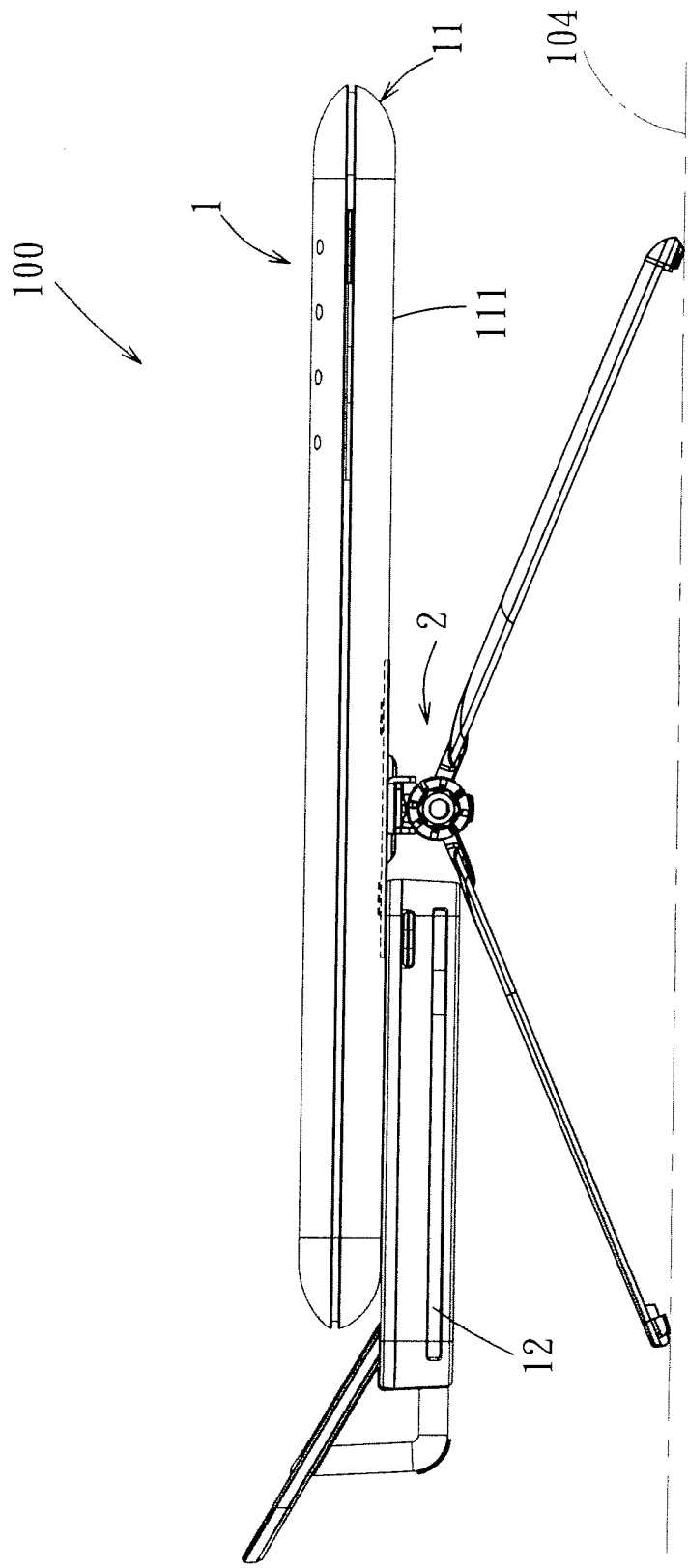
FIG. 3 is a side view of the preferred embodiment when the display device is supported by the support frame at a substantially horizontal or lying position.

With reference to FIGS. 1, 2 and 3, the preferred embodiment of an electronic apparatus 100 according to the present invention includes a display device 1 and a support frame 2. The display device 1 includes a first outer housing 11 and a display unit (not shown) disposed inside the first outer housing 11. The first outer housing 11 includes a backside 111 and a bottom edge 112, and the backside 111 is provided with an opening 113. The support frame 2 is mounted to the backside 111 of the first outer housing 11, and is operable to support the display device 1 at one of a substantially upright or back-tilting position (hereinafter referred to as "the upright position") as shown in FIG. 2, and a substantially horizontal or lying position (hereinafter referred to as "the lying position") as shown in FIG. 3.

Other than the abovementioned components, the electronic apparatus 100 further includes a host unit 12 disposed at the backside 111 of the first outer housing 11. The host unit 12 includes a second outer housing 121, and electronic components, such as a motherboard (not shown) disposed within the second outer housing 121, a central processing unit (CPU) (not shown) disposed on the motherboard, a storage medium (e.g., a flash memory or a hard drive) connected electrically to the motherboard and the CPU, etc. In this embodiment, the display device 1 and the host unit 12 cooperatively constitute an all-in-one touch computer, in which the display unit of the display device 1 is a touch panel.

Figure 4:
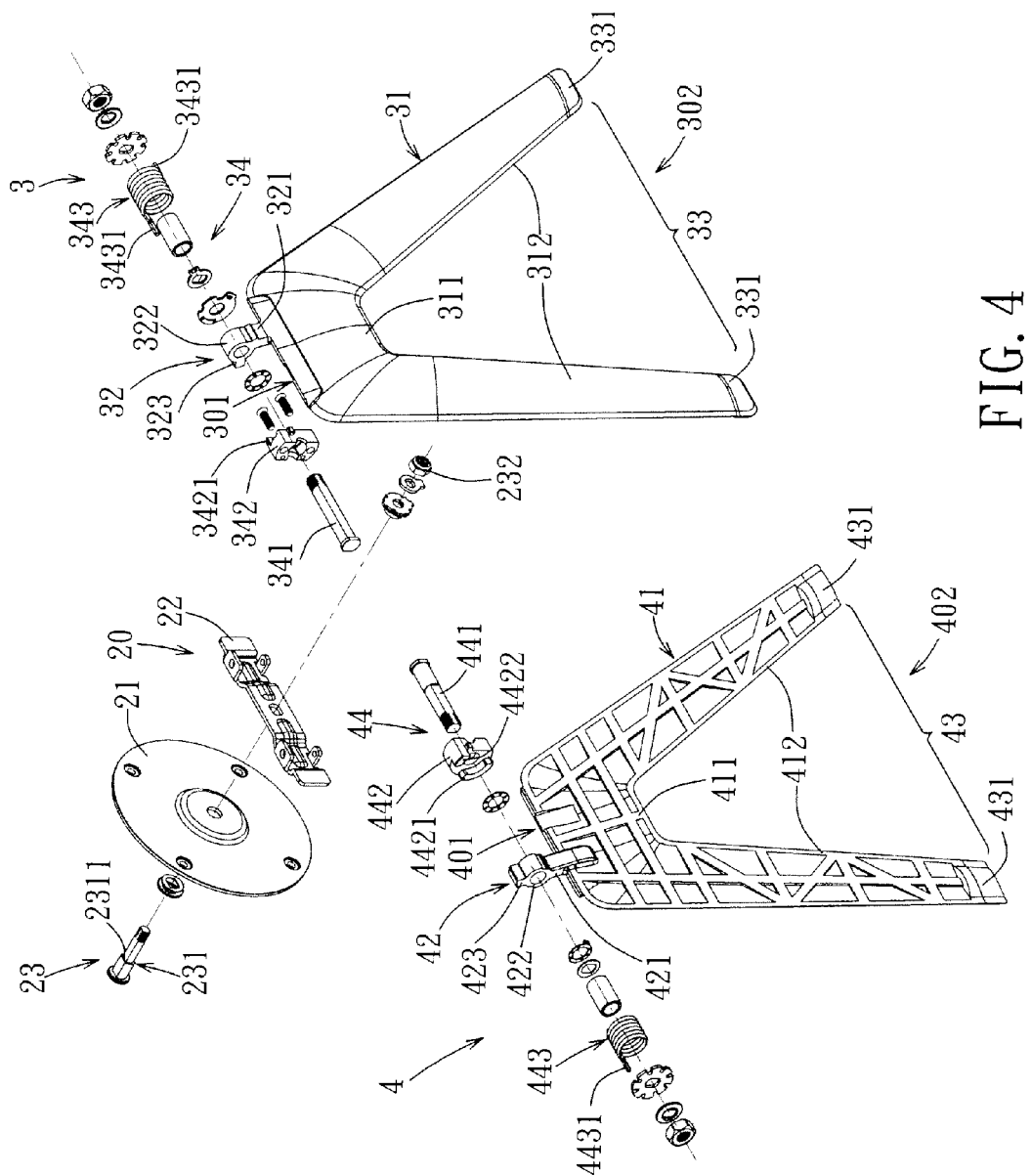
FIG. 4 is an exploded perspective view of the support frame according to the preferred embodiment.
Figure 5:
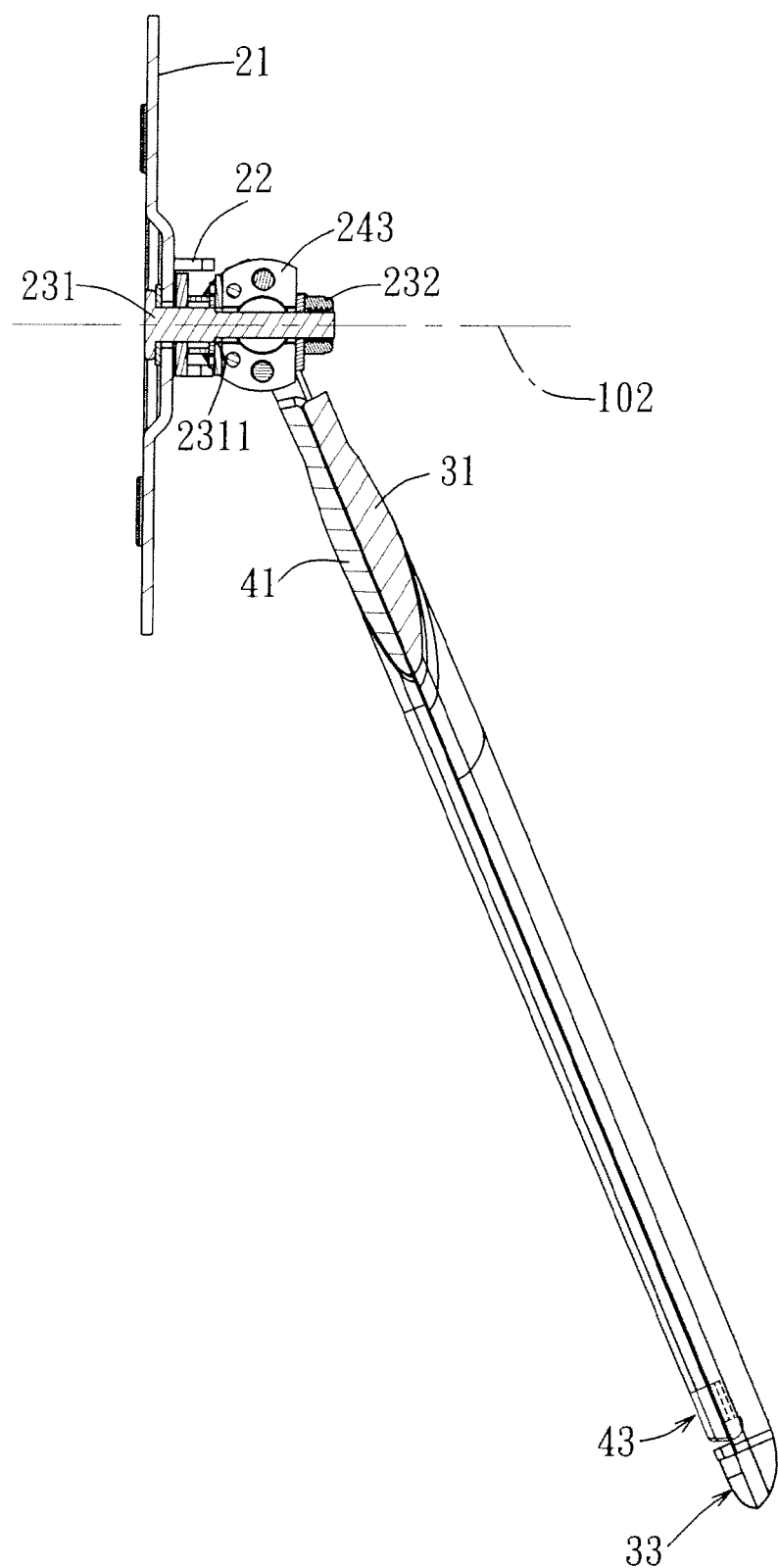
FIG. 5 is a vertical sectional view of the support frame according to the preferred embodiment.
Figure 6:
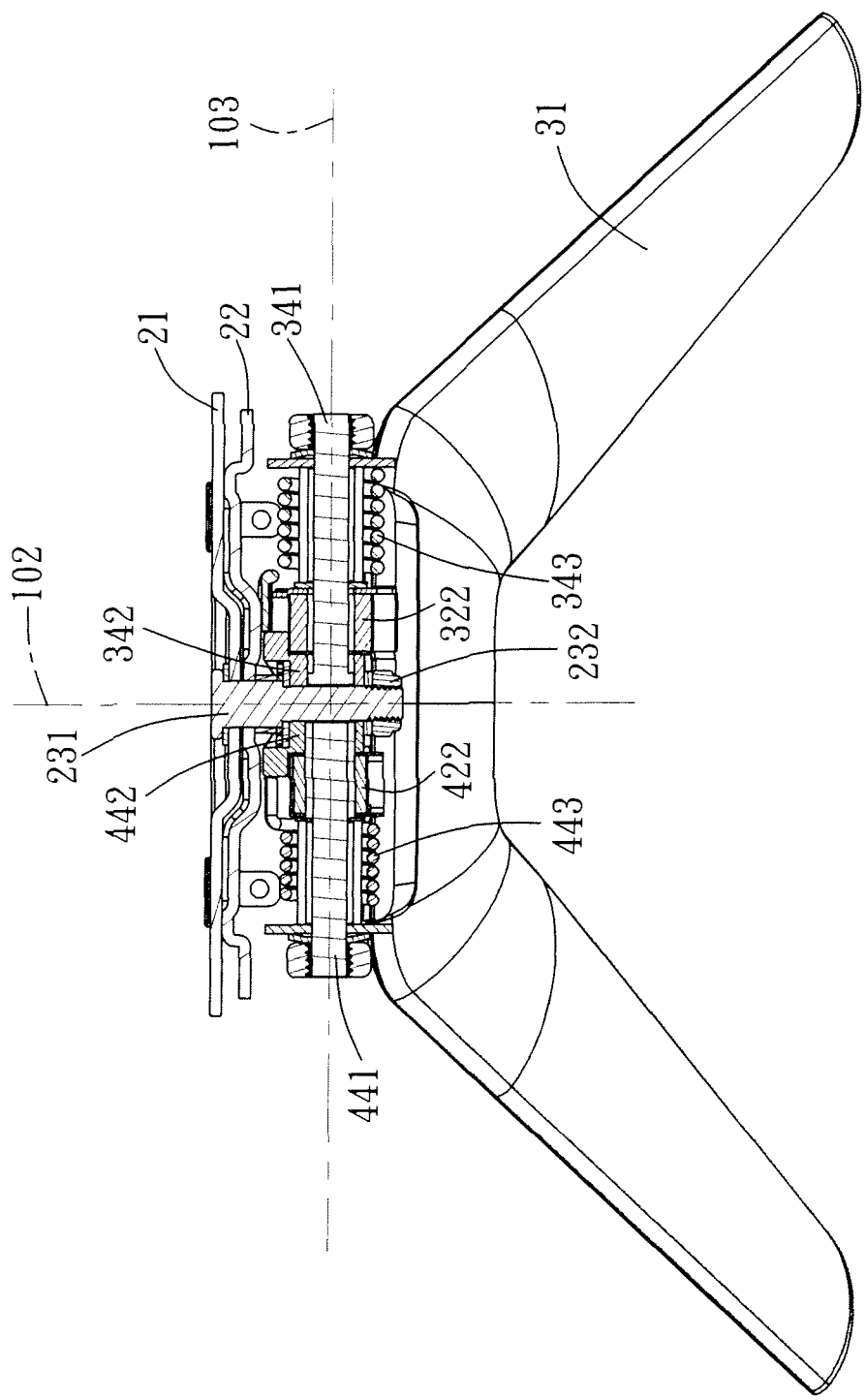
FIG. 6 is a horizontal sectional view of the support frame according to the preferred embodiment.

As shown in FIGS. 4, 5 and 6, the support frame 2 includes a pivot seat module 20, and first and second support modules 3, 4 coupled to the pivot seat module 20. The pivot seat module 20 includes a pivot seat 22 and a pivot axle unit 23. The pivot seat 22 is coupled rotatably to a connecting plate 21 via the pivot axle unit 23, and is disposed at a backside of the connecting plate 21. In more detail, the pivot axle unit 23 includes an axle rod 231 and a press member 232. The axle rod 231 is formed with a step part 2311. The axle rod 231 extends through holes in the connecting plate 21 and the pivot seat 22 in a forward-rearward direction, such that the step part 2311 is exposed from a backside of the pivot seat 22. In addition, the axle rod 231 and the hole in the pivot seat 22 are non-circular, such that the pivot seat 22 is rotatable along with the axle rod 231 about a first axis, i.e., a central axis of the axle rod 231, relative to the connecting plate 21. The press member 232 is sleeved on a rear end of the axle rod 231. In this embodiment, the axle rod 231 is a screw rod and the press member 232 is a nut.

In this embodiment, the first support module 3 and the second support module 4 are both connected to the pivot axle unit 23, and are rotatable relative to the connecting plate 21.

The first support module 3 includes a first main body 21, a first connecting portion 32, a first bottom port ion 33, and a first pivot axle unit 34. The first main body 31 has a top end 301 and a bottom end 302. The first connecting portion 32 extends upwardly from the top end 301 of the first main body 31. The first bottom portion 33 is disposed at the bottom end 302 of the first main body 31. The first connecting portion 32 is connected rotatably to the first pivot axle unit 34.

The first main body 31 is substantially a thin structure having an inverted-U shape, and includes a first horizontal segment 311, and two first vertical segments 312 spaced apart from each other and extending downwardly from the first horizontal segment 311. The first horizontal segment 311 defines the top end 301 of the first main body 31. Bottom ends of the first vertical segments 312 cooperate to define the bottom end 302 of the first main body 31. The first connecting portion 32 includes a first extension segment 321 extending upwardly from the side of the first horizontal segment 311 that is closer to one of the first vertical segments 312, a first annular part 322 connected to the first extension segment 321 opposite to the first horizontal segment 311, and a first protrusion 323 protruding radially from the first annular part 322. The first bottom portion 33 includes two first foot pads 331 respectively disposed on the bottom ends of the first vertical segments 312 of the first main body 31. In this embodiment, the first pads 331 are made from a material with a relatively small friction coefficient.

The first pivot axle unit 34 includes a first axle rod 341, a first block member 342 and a first torsion spring 343. In this embodiment, the first axle rod 341 is a screw fastener, and extends through the first block member 342, the first annular part 322 of the first connecting portion 32, and the first torsion spring 343, such that the first annular part 322 is disposed between the first torsion spring 343 and the first block member 342. The first connecting portion 32 is co-rotatable with the first main body 31 in rotation about a second axis, i.e., a central axis of the first axle rod 341. In other words, the first annular part 322 is sleeved rotatably on the first axle rod 341.

Figure 7:
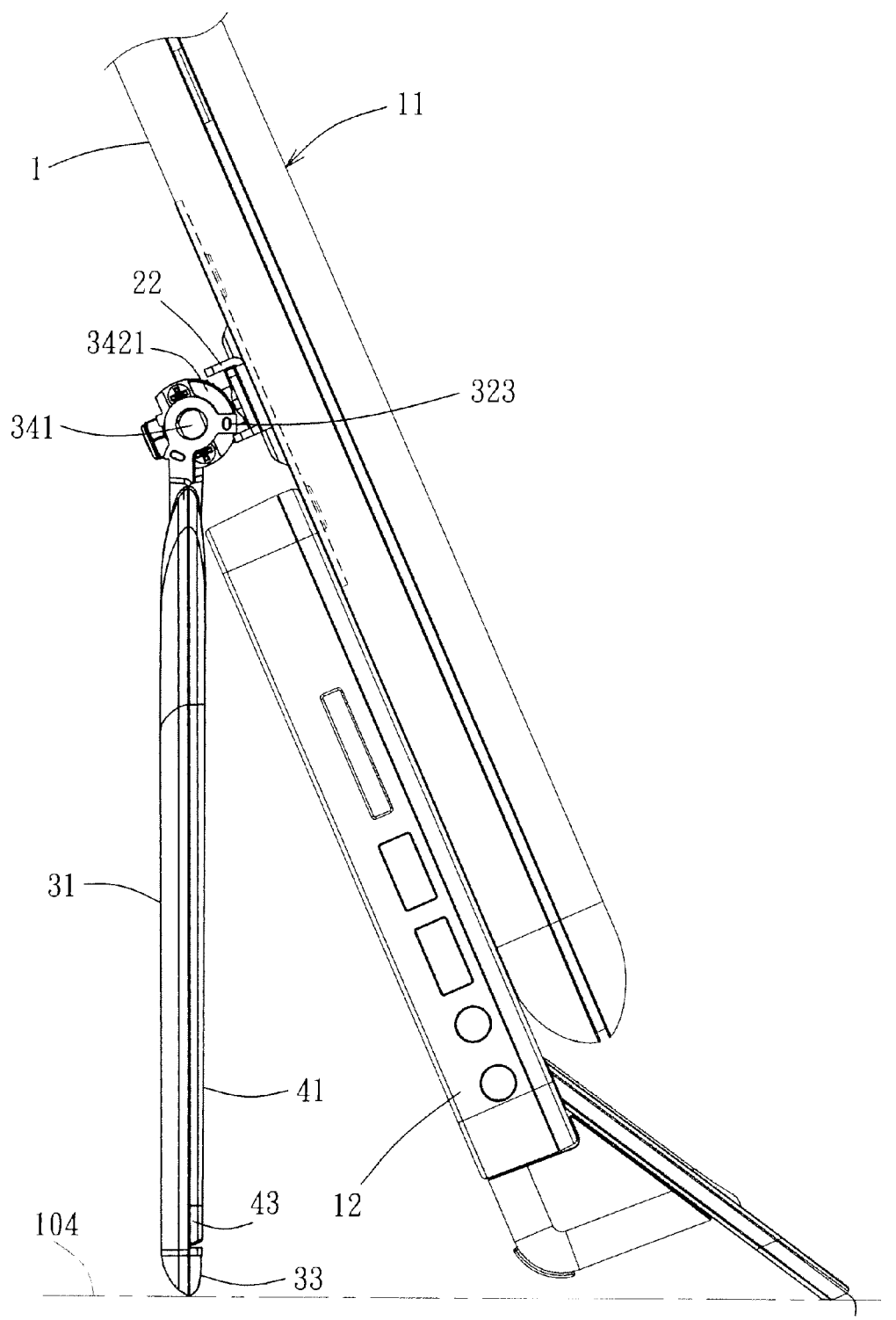
FIG. 7 is a side view of the preferred embodiment when the display device is supported by the support frame at the substantially upright or back-tilting position, illustrating relative positions of a first protrusion and a first stop.

Moreover, the first block member 342 is formed at one side that is closer to the first connecting portion 32 with a protruding first stop 3421. With further reference to FIG. 7, when the first axle rod 341 extends through the first block member 342 and the first annular part 322 of the first connecting portion 32, the first stop 3421 is disposed corresponding to the first protrusion 323 so as to limit a range of rotation of the first main body 31, as well as the first connecting portion 32, relative to the first axle rod 341 about the central axis of the first axle rod 341.

The first torsion spring 343 has two connecting segments 3431, one of which is fixed to the first extension segment 321 of the first connecting portion 32, and the other one of which is disposed at a fixed position relative to the first axle rod 341, such that the first torsion spring 343 is twisted to store a restoring force therein when the first main body 31 and the first connecting portion 32 rotate about the first axle rod 341 so as to support the display device 1 at the lying position.

With reference to FIGS. 4, 5 and 6, the second support module 4 includes a second main body 41, a second connecting portion 42, a second bottom portion 43, and a second pivot axle unit 44. The second main body 41 has a top end 401 and a bottom end 402. The second connecting portion 42 extends upwardly from the top end 401 of the second main body 41. The second bottom portion 43 is disposed at the bottom end 402 of the second main body 41. The second connecting portion 42 is rotatably connected to the second pivot axle unit 44.

The second main body 41 is substantially a thin structure having an inverted-U shape, and includes a second horizontal segment 411, and two second vertical segments 412 spaced apart from each other and extending downwardly from the second horizontal segment 411. The second horizontal segment 411 defines the top end 401 of the second main body 41. Bottom ends of the second vertical segments 412 cooperate to define the bottom end 402 of the second main body 41. The second connecting portion 42 includes a second extension segment 421 extending upwardly from the side of the second horizontal segment 411 that is closer to one of the second vertical segments 412, a second annular part 422 connected to the second extension segment 421 opposite to the second horizontal segment 411, and a second protrusion 423 protruding radially from the second annular part 422. The second bottom portion 43 includes two second foot pads 431 respectively disposed on the bottom ends of the second vertical segments 412 of the second main body 41. In this embodiment, the second foot pads 431 are made from a material with a relatively large friction coefficient.

Figure 8:
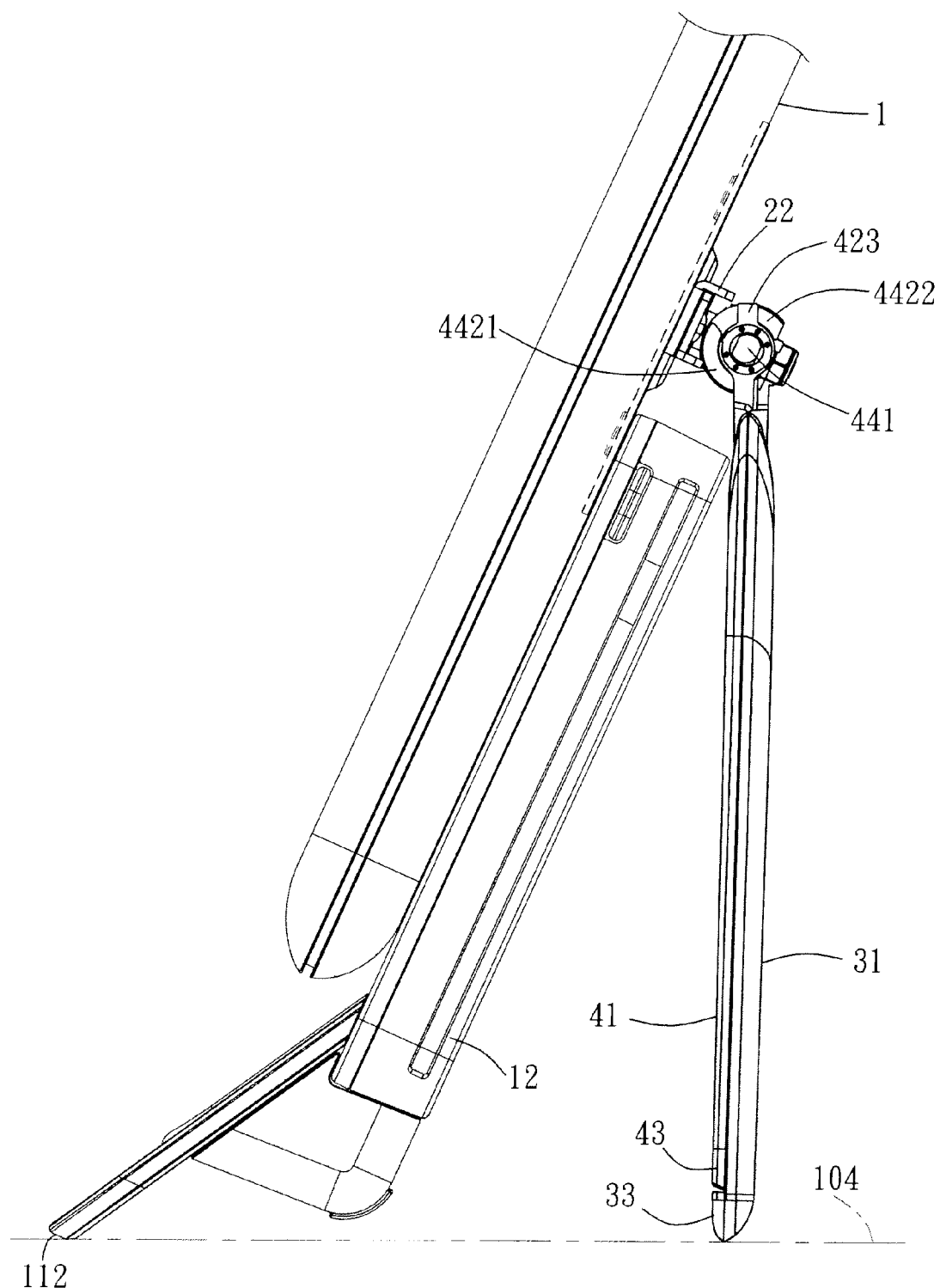
FIG. 8 is another side view of the preferred embodiment similar to FIG. 7, illustrating relative positions of a second protrusion and second and third stops.

The second pivot axle unit 44 includes a second axle rod 441, a second block member 442 and a second torsion spring 443. In this embodiment, the second axle rod 441 is a screw fastener, and extends through the second block member 442, the second annular part 422 of the second connecting portion 42, and the second torsion spring 443, such that the second annular part 422 is disposed between the second torsion spring 443 and the second block member 3442. The second connecting portion 42 is co-rotatable with the second main body 41 about the second axis, i.e., a central axis of the second axle rod 441. In other words, the second annular part 422 is sleeved rotatably on the second axle rod 441. The second block member 442 is formed at one side that is closer to the second connecting portion 42 with a protruding second stop 4421 and a protruding third stop 4422 that are spaced apart from each other. With further reference to FIG. 8, when the second axle rod 441 extends through the second block member 442 and the second annular part 422 of the second connecting portion 42, the second protrusion 423 of the second connecting portion 42 is extended between the second stop 4421 and the third stop 4422. The second stop 4421 and the third stop 4422 cooperate with the second protrusion 423 for limiting a range of rotation of the second main body 41, as well as the second connecting portion 42, relative to the second axle rod 441 about the central axis of the second axle rod 441. The second torsion spring 443 is substantially identical in structure to the second torsion spring 3443, and has two connecting segments 4431 (only one of which is visible in FIG. 4), one of which is fixed to the second extension segment 421 of the second connecting portion 42, and the other one of which is disposed at a fixed position relative to the second axle rod 441, such that the second torsion spring 443 is twisted to store a restoring force therein when the second main body 41 and the second connecting portion 42 rotate about the second axle rod 441 so as to support the display device 1 at the lying position.

The first support module 3 and the second support module 4 are coupled together by joining together the first block member 342 and the second block member 442 (use a screw fastener is optional). The joined first and second support modules 3, 4 are sleeved on a segment of the axle rod 231 that is exposed from the backside of the pivot seat 22. In addition, the first axle rod 341 and the second axle rod 441 are axially aligned. By having the press member 232 sleeved on the end of the axle rod 231, the joined first and second block members 342, 442 are urged toward the step part 2311, and the first support module 3, the second support module 4 and the pivot axle unit 23 are securely coupled together. At this time, the first block member 342 and the second block member 442 are disposed between the first connecting portion 32 and the second connecting portion 42. Further, the first main body 31 and the second main body 41 are in a substantially overlapped state, and the first bottom portion 33 protrudes from the second bottom portion 43 in the downward direction (i.e., the first main body 31 is longer than the second main body 41).

It should be noted herein that in this embodiment, the first torsion spring 343 and the second torsion spring 443 are configured to provide counteracting biasing forces, such that, without the application of external forces, the first main body 31 is biased by the first torsion spring 343 toward the second main body 41, and the second main body 41 is biased by the second torsion spring 443 toward the first main body 31.

Referring back to FIG. 1, the support frame 2 is mounted to the display device 1 by disposing the connecting plate 21 in the opening 113 in the backside 111 of the first outer housing 11 and by subsequently locking the forward side of the connecting plate 21 to an inner component (not shown) disposed forwardly of the backside 111. As such, the pivot seat 22 can bring the first support module 3 and the second support module 4 to rotate therewith relative to the display device 1 about a first axis 102 that passes through the display device 1 in a front-to-rear direction (i.e., the central axis of the axle rod 231). In addition, the first support module 3 and the second support module 4 are operable to pivot relative to the pivot seat 22 about a second axis 103 orthogonal to the first axis 102 (i.e., the second axis 103 is axially aligned with the central axes of the first axle rod 341 and the second axle rod 441).

With reference to FIG. 2, FIG. 7 and FIG. 8, when the support frame 2 is mounted to the backside 111 of the display device 1, and when the first main body 31 and the second main body 41 abut against each other, with the first bottom portion 33 of the first support module 3 of the support frame 2 and the bottom edge 112 of the first outer housing 11 of the display device 1 both resting against a surface 104, the display device 1 is supported at the upright position so as to facilitate eye-level viewing or convenient operation of the display device 1 by a user (not shown). At this time, an angle (a) is formed between the joined first and second main bodies 31, 41 and the backside 111 of the display device 1, the first protrusion 323 abuts against the first stop 3421, and the second protrusion 423 abuts against the third stop 4422. In this embodiment, since the second protrusion 423 is limited between the second stop 4421 and the third stop 4422, and due to spring constants of the first and second torsion springs 343, 443, the angle (a) formed between the joined first and second main bodies 31, 41 and the backside 111 of the display device 1 is an acute angle. However, the angle (a) is not limited to an acute angle in other embodiments of the present invention.

Figure 9:
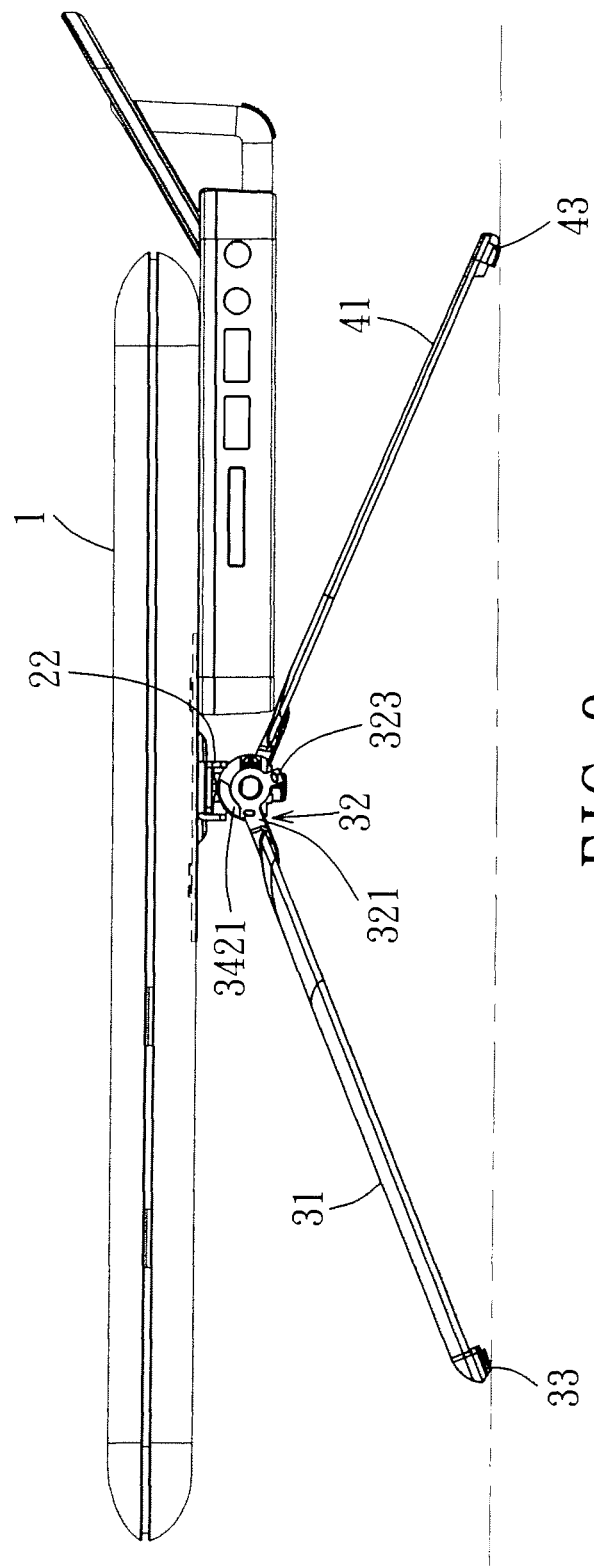
FIG. 9 is a side view of the preferred embodiment when the display device is supported by the support frame at the substantially horizontal or lying position, illustrating relative positions of the first protrusion and the first stop.
Figure 10:
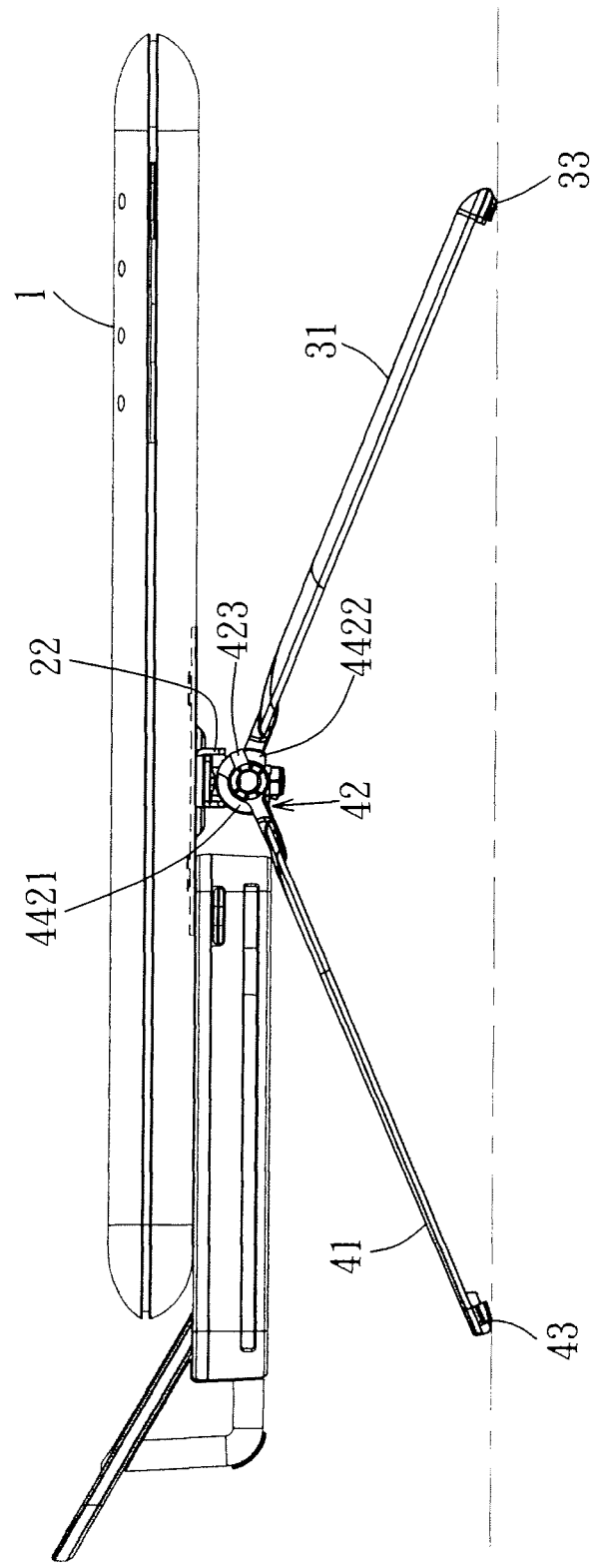
FIG. 10 is another side view of the preferred embodiment similar to FIG. 9, illustrating relative positions of the second protrusion and the second and third stops.

With reference to FIG. 3, FIG. 9 and FIG. 10, when the user wishes to change the viewing/operating angle of the display device 1, the first main body 31, along with the first connecting portion 32, is pivoted away from the second main body 41, such that the first bottom portion 33 and the second bottom portion 43 are respectively disposed in opposite regions relative to the pivot seat 22. With the first bottom portion 33 and the second bottom portion 43 resting against the surface 104, the display device 1 is supported in the lying position such that the display unit (i.e., the touch panel) of the display device 1 faces upwardly relative to the surface 104.

It should be noted herein that, as shown in FIG. 7, since the first bottom portion 33 protrudes downwardly from the second bottom portion 43 when the first and second main bodies 31, 41 abut against each other, and since the first bottom portion 33 is made from a material with a smaller friction coefficient and the second bottom portion 43 is made from a material with a larger friction coefficient, a convenient and effort-saving way of moving the display device 1 from the upright position to the lying position may include first pivoting the first main body 31 away from the second main body 41, followed by placing the first and second bottom portions 33, 43 to rest on the surface 104, and while the second bottom portion 43 rests on the surface 104, the first bottom portion 33 slides away from the second bottom portion 43 by virtue of weight of the display device 1 until, as shown in FIG. 10, the first extension segment 321 of the first connecting portion 32 abuts against the first stop 3421, at which time the first and second bottom portions 33, 43 are respectively disposed in said opposite regions relative to the pivot seat 22 behind the backside 111 of the display device 1.

When the display device 1 is supported at the lying position, and the user needs to operate the display unit of the display device 1, lifting of the user's hands is not required as is the case when the display device 1 is disposed at the substantially upright position.

Moreover, an advantage attributed to the first torsion spring 343 (as shown in FIG. 4) and the second torsion spring 443 (as shown in FIG. 4) resides in that once the first bottom portion 33 and the second bottom portion 43 are lifted from the surface 104, by virtue of the restoring forces stored in the first torsion spring 343 and the second torsion spring 443, the first main body 31 and the second main body 41 will automatically pivot toward each other without any extra effort from the user.

Figure 11:
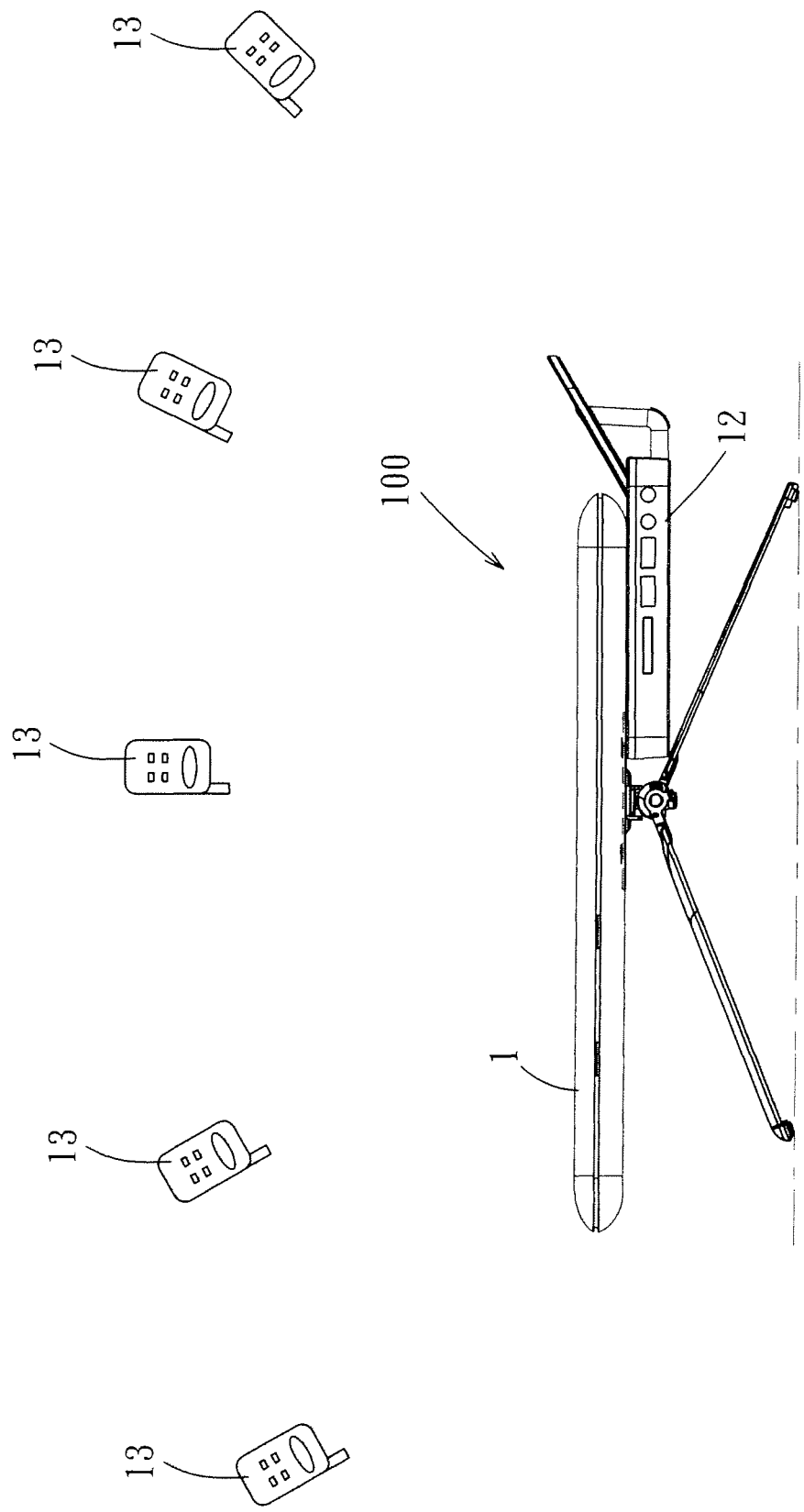
FIG. 11 is a schematic diagram, illustrating the electronic apparatus according to the preferred embodiment further including a plurality of wireless controllers.

It should be further noted herein that, as illustrated in FIG. 11, the electronic apparatus 100 may further include a plurality of wireless controllers 13 that are separate from the display device 1 and the host unit 12. Each of the wireless controllers 13 is provided with a signal transmitter, while the host unit 12 is provided with a signal receiver, such that multiple people can use the wireless controllers 13 to control the host unit 12 to operate the display device 1 without having to physically contact the display device 1.

In addition, although in this embodiment, the first main body 31 is longer than the second main body 41 such that the first bottom portion 33 (i.e., the first pads 331) rests on the flat surface 104 while the second bottom portion 43 (i.e., the second foot pads 431) is not in contact with the flat surface 104 when the support frame 2 supports the display device 1 at the upright position, the second main body 41 may be longer than the first main body 31 in other embodiments of the present invention such that the second bottom portion 43 rests on the flat surface 104 while the first bottom portion 33 does not when the support frame 2 supports the display device 1 at the upright position. Moreover, in this embodiment, the first support module 3 and the second support module 4 are both pivoted to the pivot axle unit 23 of the same pivot seat module 20. However, in other embodiments of the present invention, there may be two separate pivot seat modules about which the first and second support modules 3, 4 are respectively and independently pivotable.

Further, the support frame 2 is mounted to the backside 111 of the first outer housing 11 of the display device 1 via the connecting plate 21 in this embodiment. However, the connecting plate 21 may be omitted, and the pivot seat 22 may be connected directly to the backside 111 of the first outer housing 11 in other embodiments of the present invention.

In summary, with the design of the first support module 3 and the second support module 4 of the support frame 2, the display device 1 may be supported at two different positions, namely a substantially upright or back-tilting position, and a substantially horizontal or lying position, according to the present invention. Therefore, as compared to the conventional support frame, the present invention provides the display device 1 with various operating angles so as to enhance user flexibility, convenience and comfort.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A support frame adapted to be disposed on a backside of a display device and to provide support to the display device, said support frame comprising:
   a pivot seat module adapted to be mounted to the display device for rotation relative to the display device about a first axis passing through the display device;
   a first support module coupled to said pivot seat module, and disposed to form an angle with the backside of the display device for supporting the display device at a substantially upright position; and
   a second support module coupled to said pivot seat module, pivotable relative to said pivot seat module about a second axis that is orthogonal to the first axis, and cooperating with said first support module to support the display device at a lying position; wherein:
   said first support module includes a first main body having top and bottom ends, a first pivot axle unit, and a first connecting portion extending from said top end of said first main body away from said bottom end of said first main body, said first connecting portion being coupled rotatably to said first pivot axle unit;
   said second support module includes a second main body having top and bottom ends, a second pivot axle unit, and a second connecting portion extending from said top end of said second main body away from said bottom end of said second main body, said second connecting portion being coupled rotatably to said second pivot axle unit;
   said first and second pivot axle units are axially aligned;
   said first pivot axle unit includes a first axle rod and a first block member, said first axle rod extending rotatably through said first block member and said first connecting portion;
   said second pivot axle unit includes a second axle rod and a second block member, said second axle rod extending rotatably through said second block member and said second connecting portion; and
   said first and second block members are coupled together such that said first and second pivot axle units are coupled together and are co-rotatable about the first axis relative to said pivot seat module, said first and second block members being interposed between said first and second connecting portions, said first axle rod and said second axle rod being axially aligned and defining the second axis.

2. The support frame as claimed in claim 1, wherein said pivot seat module includes a pivot axle unit defining the first axis, and a pivot seat coupled to said pivot axle unit, said first and second support modules being coupled to said pivot axle unit and being rotatable about the first axis.

3. The support frame as claimed in claim 2, further comprising a connecting plate adapted to be coupled to the backside of the display device, said pivot axle unit extending through said connecting plate and said pivot seat and being coupled to said first and second support modules, said pivot seat and said pivot axle unit being rotatable relative to said connecting plate about the first axis.

4. The support frame as claimed in claim 1, wherein said first block member is formed with a first stop extending toward said first connecting portion, said first connecting portion including a first extension segment that extends from said top end of said first main body away from said bottom end of said first main body, a first annular part that is connected to said first extension segment opposite to said first main body, and that is sleeved rotatably on said first axle rod, and a first protrusion that protrudes radially from said first annular part,
   said first stop and said first protrusion cooperating to limit a range of rotation of said first annular part and said first main body about the second axis relative to said first axle rod, where said first protrusion abuts against said first stop when the display device is supported at the substantially upright position, and where said first extension segment abuts against said first stop when the display device is supported at the lying position.

5. The support frame as claimed in claim 4, wherein said first main body includes a first horizontal segment, and two first vertical segments spaced apart from each other and extending from said first horizontal segment, said first extension segment of said first connecting portion extending from said first horizontal segment away from said first vertical segments.

6. The support frame as claimed in claim 1, wherein said second connecting portion includes a second extension segment extending from said top end of said second main body away from said bottom end of said second main body, and a second annular part connected to said second extension segment opposite to said second main body, said second annular part being sleeved rotatably on said second axle rod.

7. The support frame as claimed in claim 6, wherein said second block member is formed with spaced apart second and third stops extending toward said second connecting portion, said second connecting portion further including a second protrusion that protrudes radially from said second annular part, said second protrusion being disposed between said second and third stops when said second annular part is sleeved on said second axle rod, such that said second and third stops cooperate with said second protrusion to limit a range of rotation of said second annular part and said second main body about the second axis relative to said second axle rod.

8. The support frame as claimed in claim 7, wherein said second main body includes a second horizontal segment, and two second vertical segments spaced apart from each other and extending from said second horizontal segment, said second extension segment of said second connecting portion extending from said second horizontal segment away from said second vertical segments.

9. The support frame as claimed in claim 8, wherein said first main body is pivotable so as to abut against said second main body, and said first pivot axle unit further includes a first torsion spring connected to said first connecting portion and said first axle rod for biasing said first main body toward said second main body.

10. The support frame as claimed in claim 9, wherein said second pivot axle unit further includes a second torsion spring connected to said second connecting portion and said second axle rod for biasing said second main body toward said first main body.

11. An electronic apparatus comprising:
a display device having a backside; and
a support frame including
a pivot seat module mounted to said display device for rotation relative to said display device about a first axis passing through said display device,
a first support module coupled to said pivot seat module, and disposed to form an angle with said backside of said display device for supporting said display device at a substantially upright position, and
a second support module coupled to said pivot seat module, pivotable relative to said pivot seat module about a second axis that is orthogonal to the first axis, and cooperating with said first support module to support said display device at a lying position; wherein:
said first support module includes a first main body having top and bottom ends, a first pivot axle unit, and a first connecting portion extending from said top end of said first main body away from said bottom end of said first main body, said first connecting portion being coupled rotatably to said first pivot axle unit;
said second support module includes a second main body having top and bottom ends, a second pivot axle unit, and a second connecting portion extending from said top end of said second main body away from said bottom end of said second main body, said second connecting portion being coupled rotatably to said second pivot axle unit;
said first and second pivot axle units are axially aligned;
said first pivot axle unit includes a first axle rod and a first block member, said first axle rod extending rotatably through said first block member and said first connecting portion;

said second pivot axle unit includes a second axle rod and a second block member, said second axle rod extending rotatably through said second block member and said second connecting portion; and
said first and second block members are coupled together such that said first and second pivot axle units are coupled together and are co-rotatable about the first axis relative to said pivot seat module, said first and second block members being interposed between said first and second connecting portions, said first axle rod and said second axle rod being axially aligned and defining the second axis.

12. The electronic apparatus as claimed in claim 11, wherein said pivot seat module includes a pivot axle unit defining the first axis, and a pivot seat coupled to said pivot axle unit, said first and second support modules being coupled to said pivot axle unit and being rotatable about the first axis.

13. The electronic apparatus as claimed in claim 12, wherein said support frame further includes a connecting plate coupled to said backside of said display device, said pivot axle unit extending through said connecting plate and said pivot seat and being coupled to said first and second support modules, said pivot seat and said pivot axle unit being rotatable relative to said connecting plate about the first axis.

14. The electronic apparatus as claimed in claim 11, wherein said first block member is formed with a first stop extending toward said first connecting portion, said first connecting portion including a first extension segment that extends from said top end of said first main body away from said bottom end of said first main body, a first annular part that is connected to said first extension segment opposite to said first main body, and that is sleeved rotatably on said first axle rod, and a first protrusion that protrudes radially from said first annular part, said first stop and said first protrusion cooperating to limit a range of rotation of said first annular part and said first main body about the second axis relative to said first axle rod, where said first protrusion abuts against said first stop when said display device is supported at the substantially upright position, and where said first extension segment abuts against said first stop when said display device is supported at the lying position.

15. The electronic apparatus as claimed in claim 14, wherein said first main body includes a first horizontal segment, and two first vertical segments spaced apart from each other and extending from said first horizontal segment, said first extension segment of said first connecting portion extending from said first horizontal segment away from said first vertical segments.

16. The electronic apparatus as claimed in claim 11, wherein said second connecting portion includes a second extension segment extending from said top end of said second main body away from said bottom end of said second main body, and a second annular part connected to said second extension segment opposite to said second main body, said second annular part being sleeved rotatably on said second axle rod.

17. The electronic apparatus as claimed in claim 16, wherein said second block member is formed with spaced apart second and third stops extending toward said second connecting portion, said second connecting portion further including a second protrusion that protrudes radially from said second annular part, said second protrusion being disposed between said second and third stops when said second annular part is sleeved on said second axle rod, such that said second and third stops cooperate with said second protrusion to limit a range of rotation of said second annular part and said second main body about the second axis relative to said first axle rod.

18. The electronic apparatus as claimed in claim 17, wherein said second main body includes a second horizontal segment, and two second vertical segments spaced apart from each other and extending from said second horizontal segment, said second extension segment of said second connecting portion extending from said second horizontal segment away from said second vertical segments.

19. The electronic apparatus as claimed in claim 11, wherein said first main body is pivotable so as to abut against said second main body, and said first pivot axle unit further includes a first torsion spring connected to said first connecting portion and said first axle rod for biasing said first main body toward said second main body.

20. The electronic apparatus as claimed in claim 11, wherein said second pivot axle unit further includes a second torsion spring connected to said second connecting portion and said second axle rod for biasing said second main body toward said first main body.

21. An electronic apparatus comprising:
a display device having a backside; and
a support frame disposed on said backside of said display device, said support frame including
a pivot seat module,
a first support module coupled to said pivot seat module, and
a second support module coupled to said pivot seat module;
wherein said first and second support modules are operable to abut against each other and support said display device at a substantially upright position; and
wherein said first and second support modules are operable to pivot relative to said pivot seat module away from each other and support said display device at a lying position; wherein:
said first support module includes a first main body having top and bottom ends, a first pivot axle unit, and a first connecting portion extending from said top end of said first main body away from said bottom end of said first main body, said first connecting portion being coupled rotatably to said first pivot axle unit; and
said second support module includes a second main body having top and bottom ends, a second pivot axle unit, and a second connecting portion extending from said top end of said second main body away from said bottom end of said second main body, said second connecting portion being coupled rotatably to said second pivot axle unit;
said first and second pivot axle units are axially aligned;
said first pivot axle unit includes a first axle rod and a first block member, said first axle rod extending rotatably through said first block member and said first connecting portion;
said second pivot axle unit includes a second axle rod and a second block member, said second axle rod extending rotatably through said second block member and said second connecting portion; and
said first and second block members are coupled together such that said first and second pivot axle units are coupled together and are co-rotatable about the first axis relative to said pivot seat module, said first and second block members being interposed between said first and second connecting portions, said first axle rod and said second axle rod being axially aligned and defining the second axis.

22. The electronic apparatus as claimed in claim 21, further comprising a host unit coupled to said display device for controlling operation of said display device according to a signal transmitted from a wireless controller.

\* \* \* \* \*